United States Patent
Diagilev et al.

(10) Patent No.: US 12,293,560 B2
(45) Date of Patent: May 6, 2025

(54) CONTEXT BASED SEPARATION OF ON-/OFF-VEHICLE POINTS OF INTEREST IN VIDEOS

(71) Applicant: AUTOBRAINS TECHNOLOGIES LTD, Tel Aviv-Jaffa (IL)

(72) Inventors: Kirill Diagilev, Troy, NY (US); Shiyong Lin, Manhasset, NY (US)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 324 days.

(21) Appl. No.: 18/049,992

(22) Filed: Oct. 26, 2022

(65) Prior Publication Data

US 2023/0143262 A1    May 11, 2023

Related U.S. Application Data

(60) Provisional application No. 63/263,078, filed on Oct. 26, 2021.

(51) Int. Cl.
  *G06V 10/25* (2022.01)
  *G06T 7/13* (2017.01)
  (Continued)

(52) U.S. Cl.
  CPC .............. *G06V 10/25* (2022.01); *G06T 7/13* (2017.01); *G06T 7/62* (2017.01); *G06V 10/761* (2022.01);
  (Continued)

(58) Field of Classification Search
  CPC .. G06V 10/25; G06V 10/761; G06V 2201/07; G06V 10/751; G06V 20/64;
  (Continued)

(56) References Cited

U.S. PATENT DOCUMENTS 4,601,395 A    7/1986    Juvinall et al.
4,733,353 A    3/1988    Jaswa
(Continued)

FOREIGN PATENT DOCUMENTS

AU    2007201966 B2    2/2010
CN    101539530 A    9/2009
(Continued)

OTHER PUBLICATIONS

Zhou et al., "Ensembling neural networks: Many could be better than all", National Laboratory for Novel Software Technology, Nanjing University, Hankou Road 22, Nanjing 210093, PR China Received Nov. 16, 2001, Available online Mar. 12, 2002, pp. 239-263.
(Continued)

*Primary Examiner* — Siamak Harandi
*Assistant Examiner* — Andrew S Budisalich
(74) *Attorney, Agent, or Firm* — RECHES PATENTS

(57) ABSTRACT

A method for context based separation between vehicle pixels and background pixels, which may include receiving a first image and a second image, the first image and the second images are of temporarily adjacent to each other and capture a same vehicle and background content. The method may also include obtaining a first bounding box that surrounds at least a part of the vehicle within the first image; wherein the first bounding has a first width and a first height; obtaining a second bounding box that surrounds at least the part of the vehicle within the second image; wherein the second bounding box has a second width and a second height; obtaining a mapping between pairs of initially matched pixels, wherein each pair comprises a first pixel and a second pixel that correspond to same entity portion, wherein the entity portion is a portion of the vehicle or of the background content. The method may also include deter-
(Continued)

mining, for each pair of at least some of the pairs, a first normalized relative location of a first pixel of the pair within the first bounding box and a second normalized relative location of a second pixel of the pair within the second bounding box; and determining for the each pair whether the pair is a vehicle related pair or a background content pair.

19 Claims, 5 Drawing Sheets

(51) Int. Cl.
  *G06T 7/62* (2017.01)
  *G06V 10/74* (2022.01)
(52) U.S. Cl.
  CPC .............. *G06T 2207/30252* (2013.01); *G06V 2201/07* (2022.01)
(58) Field of Classification Search
  CPC ........ G06V 10/26; G06V 10/62; G06V 20/58; G06T 7/13; G06T 7/62; G06T 2207/30252; G06T 7/174; G06T 7/11; G06T 7/194
  See application file for complete search history.

(56) References Cited

U.S. PATENT DOCUMENTS

| | | | |
|---|---|---|---|
| 4,932,645 A | 6/1990 | Schorey et al. |
| 4,972,363 A | 11/1990 | Nguyen et al. |
| 5,078,501 A | 1/1992 | Tekker et al. |
| 5,214,746 A | 5/1993 | Fogel et al. |
| 5,307,451 A | 4/1994 | Clark |
| 5,369,773 A | 11/1994 | Hammerstrom |
| 5,412,564 A | 5/1995 | Ecer |
| 5,436,653 A | 7/1995 | Ellis et al. |
| 5,568,181 A | 10/1996 | Greenwood et al. |
| 5,638,425 A | 6/1997 | Meador, I et al. |
| 5,745,678 A | 4/1998 | Herzberg et al. |
| 5,754,938 A | 5/1998 | Herz et al. |
| 5,763,069 A | 6/1998 | Jordan |
| 5,806,061 A | 9/1998 | Chaudhuri et al. |
| 5,835,087 A | 11/1998 | Herz et al. |
| 5,835,901 A | 11/1998 | Duvoisin et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,926,812 A | 7/1999 | Hilsenrath et al. |
| 5,978,754 A | 11/1999 | Kumano |
| 5,991,306 A | 11/1999 | Burns et al. |
| 5,999,637 A | 12/1999 | Toyoda et al. |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,163,510 A | 12/2000 | Lee et al. |
| 6,243,375 B1 | 6/2001 | Speicher |
| 6,243,713 B1 | 6/2001 | Nelson et al. |
| 6,275,599 B1 | 8/2001 | Adler et al. |
| 6,314,419 B1 | 11/2001 | Faisal |
| 6,329,986 B1 | 12/2001 | Cheng |
| 6,381,656 B1 | 4/2002 | Shankman |
| 6,411,229 B2 | 6/2002 | Kobayashi |
| 6,422,617 B1 | 7/2002 | Fukumoto et al. |
| 6,459,991 B1 | 10/2002 | Takiguchi et al. |
| 6,507,672 B1 | 1/2003 | Watkins et al. |
| 6,523,046 B2 | 2/2003 | Liu et al. |
| 6,524,861 B1 | 2/2003 | Anderson |
| 6,546,405 B2 | 4/2003 | Gupta et al. |
| 6,550,018 B1 | 4/2003 | Abonamah et al. |
| 6,557,042 B1 | 4/2003 | He et al. |
| 6,594,699 B1 | 7/2003 | Sahai et al. |
| 6,601,026 B2 | 7/2003 | Appelt et al. |
| 6,611,628 B1 | 8/2003 | Sekiguchi et al. |
| 6,618,711 B1 | 9/2003 | Ananth |
| 6,643,620 B1 | 11/2003 | Contolini et al. |
| 6,643,643 B1 | 11/2003 | Lee et al. |
| 6,665,657 B1 | 12/2003 | Dibachi |
| 6,681,032 B2 | 1/2004 | Bortolussi et al. |
| 6,704,725 B1 | 3/2004 | Lee |
| 6,732,149 B1 | 5/2004 | Kephart |
| 6,742,094 B2 | 5/2004 | Igari |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,877,134 B1 | 4/2005 | Fuller et al. |
| 6,901,207 B1 | 5/2005 | Watkins |
| 6,938,025 B1 | 8/2005 | Lulich et al. |
| 6,985,172 B1 | 1/2006 | Rigney et al. |
| 7,013,051 B2 | 3/2006 | Sekiguchi et al. |
| 7,020,654 B1 | 3/2006 | Najmi |
| 7,023,979 B1 | 4/2006 | Wu et al. |
| 7,043,473 B1 | 5/2006 | Rassool et al. |
| 7,158,681 B2 | 1/2007 | Persiantsev |
| 7,215,828 B2 | 5/2007 | Luo |
| 7,260,564 B1 | 8/2007 | Lynn et al. |
| 7,289,643 B2 | 10/2007 | Brunk et al. |
| 7,299,261 B1 | 11/2007 | Oliver et al. |
| 7,302,089 B1 | 11/2007 | Smits |
| 7,302,117 B2 | 11/2007 | Sekiguchi et al. |
| 7,313,805 B1 | 12/2007 | Rosin et al. |
| 7,340,358 B2 | 3/2008 | Yoneyama |
| 7,346,629 B2 | 3/2008 | Kapur et al. |
| 7,353,224 B2 | 4/2008 | Chen et al. |
| 7,376,672 B2 | 5/2008 | Weare |
| 7,383,179 B2 | 6/2008 | Alves et al. |
| 7,433,895 B2 | 10/2008 | Li et al. |
| 7,464,086 B2 | 12/2008 | Black et al. |
| 7,529,659 B2 | 5/2009 | Wold |
| 7,577,656 B2 | 8/2009 | Kawai et al. |
| 7,657,100 B2 | 2/2010 | Gokturk et al. |
| 7,660,468 B2 | 2/2010 | Gokturk et al. |
| 7,805,446 B2 | 9/2010 | Potok et al. |
| 7,860,895 B1 | 12/2010 | Scofield et al. |
| 7,872,669 B2 | 1/2011 | Darrell et al. |
| 7,921,288 B1 | 4/2011 | Hildebrand |
| 7,933,407 B2 | 4/2011 | Keidar et al. |
| 8,023,739 B2 | 9/2011 | Hohimer et al. |
| 8,026,944 B1 | 9/2011 | Sah |
| 8,266,185 B2 | 9/2012 | Raichelgauz et al. |
| 8,285,718 B1 | 10/2012 | Ong et al. |
| 8,312,031 B2 | 11/2012 | Raichelgauz et al. |
| 8,315,442 B2 | 11/2012 | Gokturk et al. |
| 8,345,982 B2 | 1/2013 | Gokturk et al. |
| 8,386,400 B2 | 2/2013 | Raichelgauz et al. |
| 8,396,876 B2 | 3/2013 | Kennedy et al. |
| 8,418,206 B2 | 4/2013 | Bryant et al. |
| 8,442,321 B1 | 5/2013 | Chang et al. |
| 8,457,827 B1 | 6/2013 | Ferguson et al. |
| 8,495,489 B1 | 7/2013 | Everingham |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| RE44,963 E | 6/2014 | Shannon |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,861 B2 | 10/2014 | Shimizu et al. |
| 8,886,648 B1 | 11/2014 | Procopio et al. |
| 8,954,887 B1 | 2/2015 | Tseng et al. |
| 8,990,199 B1 | 3/2015 | Ramesh et al. |

(56) References Cited

U.S. PATENT DOCUMENTS

| | | |
|---|---|---|
| 9,009,086 B2 | 4/2015 | Raichelgauz et al. |
| 9,104,747 B2 | 8/2015 | Raichelgauz et al. |
| 9,165,406 B1 | 10/2015 | Gray et al. |
| 9,235,557 B2 | 1/2016 | Raichelgauz et al. |
| 9,286,623 B2 | 3/2016 | Raichelgauz et al. |
| 9,311,308 B2 | 4/2016 | Sankarasubramaniam et al. |
| 9,323,754 B2 | 4/2016 | Ramanathan et al. |
| 9,392,324 B1 | 7/2016 | Maltar et al. |
| 9,416,499 B2 | 8/2016 | Cronin et al. |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,807,442 B2 | 10/2017 | Bhatia et al. |
| 9,863,928 B1 | 1/2018 | Peterson et al. |
| 9,875,445 B2 | 1/2018 | Amer et al. |
| 9,953,533 B1 | 4/2018 | Graves |
| 9,953,535 A1 | 4/2018 | Canavor et al. |
| 9,984,369 B2 | 5/2018 | Li et al. |
| 10,048,700 B1 | 8/2018 | Curlander et al. |
| 10,157,291 B1 | 12/2018 | Kenthapadi et al. |
| 10,235,882 B1 | 3/2019 | Aoude et al. |
| 10,253,468 B1 | 4/2019 | Linville et al. |
| 10,395,332 B1 | 8/2019 | Konrardy et al. |
| 10,414,398 B2 | 9/2019 | Ochi |
| 10,416,670 B1 | 9/2019 | Fields et al. |
| 10,417,914 B1 | 9/2019 | Vose et al. |
| 10,467,893 B1 | 11/2019 | Soryal et al. |
| 10,545,023 B1 | 1/2020 | Herbach et al. |
| 10,684,626 B1 | 6/2020 | Martin |
| 10,896,447 B1* | 1/2021 | Cohen .................. G06F 3/0481 |
| 10,916,124 B2 | 2/2021 | Geisler |
| 10,922,788 B1 | 2/2021 | Yu et al. |
| 10,967,877 B2 | 4/2021 | Asakura et al. |
| 2001/0019633 A1 | 9/2001 | Tenze et al. |
| 2001/0034219 A1 | 10/2001 | Hewitt et al. |
| 2001/0038876 A1 | 11/2001 | Anderson |
| 2002/0004743 A1 | 1/2002 | Kutaragi et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0042914 A1 | 4/2002 | Walker et al. |
| 2002/0072935 A1 | 6/2002 | Rowse et al. |
| 2002/0087530 A1 | 7/2002 | Smith et al. |
| 2002/0087828 A1 | 7/2002 | Arimilli et al. |
| 2002/0091947 A1 | 7/2002 | Nakamura |
| 2002/0107827 A1 | 8/2002 | Benitez-Jimenez et al. |
| 2002/0113812 A1 | 8/2002 | Walker et al. |
| 2002/0126002 A1 | 9/2002 | Patchell |
| 2002/0126872 A1 | 9/2002 | Brunk et al. |
| 2002/0129140 A1 | 9/2002 | Peled et al. |
| 2002/0147637 A1 | 10/2002 | Kraft et al. |
| 2002/0157116 A1 | 10/2002 | Jasinschi |
| 2002/0163532 A1 | 11/2002 | Thomas et al. |
| 2002/0174095 A1 | 11/2002 | Lulich et al. |
| 2002/0181336 A1 | 12/2002 | Shields |
| 2002/0184505 A1 | 12/2002 | Mihcak et al. |
| 2003/0004966 A1 | 1/2003 | Bolle et al. |
| 2003/0005432 A1 | 1/2003 | Ellis et al. |
| 2003/0037010 A1 | 2/2003 | Schmelzer |
| 2003/0041047 A1 | 2/2003 | Chang et al. |
| 2003/0089216 A1 | 5/2003 | Birmingham et al. |
| 2003/0093790 A1 | 5/2003 | Logan et al. |
| 2003/0101150 A1 | 5/2003 | Agnihotri et al. |
| 2003/0105739 A1 | 6/2003 | Essafi et al. |
| 2003/0110236 A1 | 6/2003 | Yang et al. |
| 2003/0115191 A1 | 6/2003 | Copperman et al. |
| 2003/0126147 A1 | 7/2003 | Essafi et al. |
| 2003/0140257 A1 | 7/2003 | Peterka et al. |
| 2003/0145002 A1 | 7/2003 | Kleinberger et al. |
| 2003/0158839 A1 | 8/2003 | Faybishenko et al. |
| 2003/0165269 A1 | 9/2003 | Fedorovskaya et al. |
| 2003/0174859 A1 | 9/2003 | Kim |
| 2003/0184598 A1 | 10/2003 | Graham |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0095376 A1 | 5/2004 | Graham et al. |
| 2004/0098671 A1 | 5/2004 | Graham et al. |
| 2004/0111432 A1 | 6/2004 | Adams et al. |
| 2004/0117638 A1 | 6/2004 | Monroe |
| 2004/0128511 A1 | 7/2004 | Sun et al. |
| 2004/0153426 A1 | 8/2004 | Nugent |
| 2004/0162820 A1 | 8/2004 | James et al. |
| 2004/0257233 A1 | 12/2004 | Proebsting |
| 2004/0267774 A1 | 12/2004 | Lin et al. |
| 2005/0021394 A1 | 1/2005 | Miedema et al. |
| 2005/0080788 A1 | 4/2005 | Murata |
| 2005/0114198 A1 | 5/2005 | Koningstein et al. |
| 2005/0131884 A1 | 6/2005 | Gross et al. |
| 2005/0149369 A1 | 7/2005 | Sevdermish |
| 2005/0163375 A1 | 7/2005 | Grady |
| 2005/0172130 A1 | 8/2005 | Roberts |
| 2005/0177372 A1 | 8/2005 | Wang et al. |
| 2005/0193093 A1 | 9/2005 | Mathew et al. |
| 2005/0226511 A1 | 10/2005 | Short |
| 2005/0238198 A1 | 10/2005 | Brown et al. |
| 2005/0238238 A1 | 10/2005 | Xu et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0015580 A1 | 1/2006 | Gabriel et al. |
| 2006/0020958 A1 | 1/2006 | Allamanche et al. |
| 2006/0033163 A1 | 2/2006 | Chen |
| 2006/0050993 A1 | 3/2006 | Stentiford |
| 2006/0069668 A1 | 3/2006 | Braddy et al. |
| 2006/0074588 A1 | 4/2006 | Blodgett et al. |
| 2006/0080311 A1 | 4/2006 | Potok et al. |
| 2006/0093190 A1 | 5/2006 | Cheng et al. |
| 2006/0112035 A1 | 5/2006 | Cecchi et al. |
| 2006/0129822 A1 | 6/2006 | Snijder et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri et al. |
| 2006/0248558 A1 | 11/2006 | Barton et al. |
| 2006/0251338 A1 | 11/2006 | Gokturk et al. |
| 2006/0253423 A1 | 11/2006 | McLane et al. |
| 2006/0267975 A1 | 11/2006 | Moses et al. |
| 2006/0288002 A1 | 12/2006 | Epstein et al. |
| 2007/0022374 A1 | 1/2007 | Huang et al. |
| 2007/0033170 A1 | 2/2007 | Sull et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0074147 A1 | 3/2007 | Wold |
| 2007/0081088 A1 | 4/2007 | Gotoh et al. |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0136782 A1 | 6/2007 | Ramaswamy et al. |
| 2007/0156720 A1 | 7/2007 | Maren |
| 2007/0244902 A1 | 10/2007 | Seide et al. |
| 2007/0253594 A1 | 11/2007 | Lu et al. |
| 2007/0282513 A1 | 12/2007 | Michi et al. |
| 2007/0294187 A1 | 12/2007 | Scherrer |
| 2007/0298152 A1 | 12/2007 | Baets |
| 2008/0006615 A1 | 1/2008 | Rosario et al. |
| 2008/0049789 A1 | 2/2008 | Vedantham et al. |
| 2008/0071465 A1 | 3/2008 | Chapman et al. |
| 2008/0072256 A1 | 3/2008 | Boicey et al. |
| 2008/0079729 A1 | 4/2008 | Brailovsky |
| 2008/0152231 A1 | 6/2008 | Gokturk et al. |
| 2008/0159622 A1 | 7/2008 | Agnihotri et al. |
| 2008/0161986 A1 | 7/2008 | Breed |
| 2008/0165018 A1 | 7/2008 | Breed |

(56) References Cited

U.S. PATENT DOCUMENTS

| | | |
|---|---|---|
| 2008/0165861 A1 | 7/2008 | Wen et al. |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0228749 A1 | 9/2008 | Brown |
| 2008/0228995 A1 | 9/2008 | Tan et al. |
| 2008/0237359 A1 | 10/2008 | Silverbrook et al. |
| 2008/0247543 A1 | 10/2008 | Mick et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0294278 A1 | 11/2008 | Borgeson et al. |
| 2008/0307454 A1 | 12/2008 | Ahanger et al. |
| 2008/0313140 A1 | 12/2008 | Pereira et al. |
| 2009/0024641 A1 | 1/2009 | Quigley et al. |
| 2009/0037088 A1 | 2/2009 | Taguchi |
| 2009/0043637 A1 | 2/2009 | Eder |
| 2009/0096634 A1 | 4/2009 | Emam et al. |
| 2009/0125544 A1 | 5/2009 | Brindley |
| 2009/0157575 A1 | 6/2009 | Schobben et al. |
| 2009/0165031 A1 | 6/2009 | Li et al. |
| 2009/0172030 A1 | 7/2009 | Schiff et al. |
| 2009/0208106 A1 | 8/2009 | Dunlop et al. |
| 2009/0208118 A1 | 8/2009 | Csurka |
| 2009/0216761 A1 | 8/2009 | Raichelgauz et al. |
| 2009/0220138 A1 | 9/2009 | Zhang et al. |
| 2009/0232361 A1 | 9/2009 | Miller |
| 2009/0234878 A1 | 9/2009 | Herz et al. |
| 2009/0245573 A1 | 10/2009 | Saptharishi et al. |
| 2009/0254572 A1 | 10/2009 | Redlich et al. |
| 2009/0282218 A1 | 11/2009 | Raichelgauz et al. |
| 2009/0297048 A1 | 12/2009 | Slotine et al. |
| 2010/0010751 A1 | 1/2010 | Blodgett et al. |
| 2010/0010752 A1 | 1/2010 | Blodgett et al. |
| 2010/0030474 A1 | 2/2010 | Sawada |
| 2010/0035648 A1 | 2/2010 | Huang |
| 2010/0042646 A1 | 2/2010 | Raichelgauz et al. |
| 2010/0049374 A1 | 2/2010 | Ferrin et al. |
| 2010/0082684 A1 | 4/2010 | Churchill et al. |
| 2010/0104184 A1 | 4/2010 | Bronstein et al. |
| 2010/0125569 A1 | 5/2010 | Nair et al. |
| 2010/0161652 A1 | 6/2010 | Bellare et al. |
| 2010/0162405 A1 | 6/2010 | Cook et al. |
| 2010/0191391 A1 | 7/2010 | Zeng |
| 2010/0198626 A1 | 8/2010 | Cho et al. |
| 2010/0212015 A1 | 8/2010 | Jin et al. |
| 2010/0262609 A1 | 10/2010 | Raichelgauz et al. |
| 2010/0284604 A1 | 11/2010 | Chrysanthakopoulos |
| 2010/0293057 A1 | 11/2010 | Haveliwala et al. |
| 2010/0312736 A1 | 12/2010 | Kello |
| 2010/0318493 A1 | 12/2010 | Wessling |
| 2010/0325138 A1 | 12/2010 | Lee et al. |
| 2010/0325581 A1 | 12/2010 | Finkelstein et al. |
| 2011/0035373 A1 | 2/2011 | Berg et al. |
| 2011/0055585 A1 | 3/2011 | Lee |
| 2011/0060496 A1 | 3/2011 | Nielsen et al. |
| 2011/0077028 A1 | 3/2011 | Wilkes, III et al. |
| 2011/0164180 A1 | 7/2011 | Lee |
| 2011/0164810 A1 | 7/2011 | Zang et al. |
| 2011/0190972 A1 | 8/2011 | Timmons et al. |
| 2011/0216209 A1 | 9/2011 | Fredlund et al. |
| 2011/0218946 A1 | 9/2011 | Stern et al. |
| 2011/0276680 A1 | 11/2011 | Rimon |
| 2011/0296315 A1 | 12/2011 | Lin et al. |
| 2011/0307542 A1 | 12/2011 | Wang et al. |
| 2012/0041969 A1 | 2/2012 | Priyadarshan et al. |
| 2012/0131454 A1 | 5/2012 | Shah |
| 2012/0136853 A1 | 5/2012 | Kennedy et al. |
| 2012/0155726 A1 | 6/2012 | Li et al. |
| 2012/0167133 A1 | 6/2012 | Carroll et al. |
| 2012/0179642 A1 | 7/2012 | Sweeney et al. |
| 2012/0185445 A1 | 7/2012 | Borden et al. |
| 2012/0207346 A1 | 8/2012 | Kohli et al. |
| 2012/0219191 A1 | 8/2012 | Benzarti et al. |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0265735 A1 | 10/2012 | McMillan et al. |
| 2012/0294514 A1 | 11/2012 | Saunders et al. |
| 2012/0299961 A1 | 11/2012 | Ramkumar et al. |
| 2012/0301105 A1 | 11/2012 | Rehg et al. |
| 2012/0331011 A1 | 12/2012 | Raichelgauz et al. |
| 2013/0043990 A1 | 2/2013 | Al-Jafar |
| 2013/0066856 A1 | 3/2013 | Ong et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0151522 A1 | 6/2013 | Aggarwal et al. |
| 2013/0159298 A1 | 6/2013 | Mason et al. |
| 2013/0211705 A1 | 8/2013 | Geelen et al. |
| 2013/0226930 A1 | 8/2013 | Arngren et al. |
| 2013/0227023 A1 | 8/2013 | Raichelgauz et al. |
| 2013/0283401 A1 | 10/2013 | Pabla et al. |
| 2013/0346412 A1 | 12/2013 | Raichelgauz et al. |
| 2014/0019264 A1 | 1/2014 | Wachman et al. |
| 2014/0025692 A1 | 1/2014 | Pappas |
| 2014/0037138 A1 | 2/2014 | Sato et al. |
| 2014/0125703 A1 | 5/2014 | Roveta et al. |
| 2014/0139670 A1 | 5/2014 | Kesavan et al. |
| 2014/0147829 A1 | 5/2014 | Jerauld |
| 2014/0149918 A1 | 5/2014 | Asokan et al. |
| 2014/0152698 A1 | 6/2014 | Kim et al. |
| 2014/0156691 A1 | 6/2014 | Conwell |
| 2014/0169681 A1 | 6/2014 | Drake |
| 2014/0176604 A1 | 6/2014 | Venkitaraman et al. |
| 2014/0193077 A1 | 7/2014 | Shiiyama et al. |
| 2014/0195093 A1 | 7/2014 | Litkouhi et al. |
| 2014/0198986 A1 | 7/2014 | Marchesotti |
| 2014/0201126 A1 | 7/2014 | Zadeh et al. |
| 2014/0201330 A1 | 7/2014 | Lopez et al. |
| 2014/0236414 A1 | 8/2014 | Droz et al. |
| 2014/0247342 A1 | 9/2014 | Ellenby et al. |
| 2014/0250032 A1 | 9/2014 | Huang et al. |
| 2014/0282655 A1 | 9/2014 | Roberts |
| 2014/0288453 A1 | 9/2014 | Liu et al. |
| 2014/0300722 A1 | 10/2014 | Garcia |
| 2014/0328512 A1 | 11/2014 | Gurwicz et al. |
| 2014/0330830 A1 | 11/2014 | Raichelgauz et al. |
| 2014/0341476 A1 | 11/2014 | Kulick et al. |
| 2014/0355882 A1* | 12/2014 | Hayata ............... G06T 7/11 382/173 |
| 2014/0363044 A1 | 12/2014 | Williams et al. |
| 2015/0052089 A1 | 2/2015 | Kozloski et al. |
| 2015/0057869 A1 | 2/2015 | Healey et al. |
| 2015/0071457 A1 | 3/2015 | Burciu |
| 2015/0100562 A1 | 4/2015 | Kohlmeier et al. |
| 2015/0117784 A1 | 4/2015 | Lin et al. |
| 2015/0120627 A1 | 4/2015 | Hunzinger et al. |
| 2015/0120760 A1 | 4/2015 | Wang et al. |
| 2015/0123968 A1 | 5/2015 | Holverda et al. |
| 2015/0127516 A1 | 5/2015 | Studnitzer et al. |
| 2015/0130643 A1 | 5/2015 | Nagy |
| 2015/0153735 A1 | 6/2015 | Clarke et al. |
| 2015/0166069 A1 | 6/2015 | Engelman et al. |
| 2015/0178943 A1* | 6/2015 | Li ...................... H04N 23/63 382/103 |
| 2015/0190284 A1 | 7/2015 | Censo et al. |
| 2015/0203116 A1 | 7/2015 | Fairgrieve et al. |
| 2015/0213305 A1* | 7/2015 | Sundstrom ............ G06F 16/58 382/118 |
| 2015/0213325 A1 | 7/2015 | Krishnamoorthi et al. |
| 2015/0224988 A1 | 8/2015 | Buerkle et al. |
| 2015/0248586 A1 | 9/2015 | Gaidon et al. |
| 2015/0254344 A1 | 9/2015 | Kulkarni et al. |
| 2015/0266455 A1 | 9/2015 | Wilson |
| 2015/0286742 A1 | 10/2015 | Zhang et al. |
| 2015/0286872 A1 | 10/2015 | Medioni et al. |
| 2015/0293976 A1 | 10/2015 | Guo et al. |
| 2015/0324356 A1 | 11/2015 | Gutierrez et al. |
| 2015/0332588 A1 | 11/2015 | Bulan et al. |
| 2016/0007083 A1 | 1/2016 | Gurha |
| 2016/0026707 A1 | 1/2016 | Ong et al. |
| 2016/0046298 A1 | 2/2016 | Deruyck et al. |

(56) References Cited

U.S. PATENT DOCUMENTS

| | | |
|---|---|---|
| 2016/0078339 A1 | 3/2016 | Li et al. |
| 2016/0127641 A1 | 5/2016 | Gove |
| 2016/0132194 A1 | 5/2016 | Grue et al. |
| 2016/0133130 A1 | 5/2016 | Grimm et al. |
| 2016/0142625 A1 | 5/2016 | Weksler et al. |
| 2016/0193996 A1 | 7/2016 | Stefan |
| 2016/0221592 A1 | 8/2016 | Puttagunta et al. |
| 2016/0275766 A1 | 9/2016 | Venetianer et al. |
| 2016/0284095 A1 | 9/2016 | Chalom et al. |
| 2016/0302046 A1 | 10/2016 | Velusamy |
| 2016/0306798 A1 | 10/2016 | Guo et al. |
| 2016/0330394 A1 | 11/2016 | Shahraray et al. |
| 2016/0355181 A1 | 12/2016 | Teraoka et al. |
| 2016/0379091 A1 | 12/2016 | Lin et al. |
| 2017/0007521 A1 | 1/2017 | Monsonís et al. |
| 2017/0008521 A1 | 1/2017 | Braunstein et al. |
| 2017/0017638 A1 | 1/2017 | Satyavarta et al. |
| 2017/0018178 A1 | 1/2017 | Poechmueller et al. |
| 2017/0072851 A1 | 3/2017 | Shenoy et al. |
| 2017/0075036 A1 | 3/2017 | Pikhletsky et al. |
| 2017/0078621 A1 | 3/2017 | Sahay et al. |
| 2017/0090473 A1 | 3/2017 | Cooper et al. |
| 2017/0092122 A1 | 3/2017 | Sharan |
| 2017/0111576 A1 | 4/2017 | Tojo et al. |
| 2017/0136842 A1 | 5/2017 | Anderson et al. |
| 2017/0154241 A1 | 6/2017 | Shambik et al. |
| 2017/0180623 A1 | 6/2017 | Lin |
| 2017/0243370 A1 | 8/2017 | Hoye et al. |
| 2017/0263128 A1 | 9/2017 | Chandran et al. |
| 2017/0293296 A1 | 10/2017 | Stenneth et al. |
| 2017/0297401 A1 | 10/2017 | Hrovat et al. |
| 2017/0344023 A1 | 11/2017 | Aubinger et al. |
| 2017/0351268 A1 | 12/2017 | Anderson et al. |
| 2018/0022361 A1 | 1/2018 | Rao et al. |
| 2018/0025235 A1 | 1/2018 | Fridman |
| 2018/0046869 A1 | 2/2018 | Cordell et al. |
| 2018/0060690 A1 | 3/2018 | Lee et al. |
| 2018/0061253 A1 | 3/2018 | Hyun |
| 2018/0082591 A1 | 3/2018 | Pandy |
| 2018/0101177 A1 | 4/2018 | Cohen |
| 2018/0108258 A1 | 4/2018 | Dilger |
| 2018/0113461 A1 | 4/2018 | Potnis et al. |
| 2018/0144640 A1 | 5/2018 | Price et al. |
| 2018/0151073 A1 | 5/2018 | Minemura et al. |
| 2018/0157666 A1 | 6/2018 | Raichelgauz et al. |
| 2018/0157903 A1 | 6/2018 | Tu et al. |
| 2018/0170392 A1 | 6/2018 | Yang et al. |
| 2018/0174001 A1 | 6/2018 | Kang |
| 2018/0188731 A1 | 7/2018 | Matthiesen et al. |
| 2018/0188746 A1 | 7/2018 | Lesher et al. |
| 2018/0189613 A1 | 7/2018 | Wolf et al. |
| 2018/0204335 A1 | 7/2018 | Agata et al. |
| 2018/0210462 A1 | 7/2018 | Switkes et al. |
| 2018/0218608 A1 | 8/2018 | Offenhaeuser et al. |
| 2018/0268292 A1 | 9/2018 | Choi et al. |
| 2018/0338229 A1 | 11/2018 | Nemec et al. |
| 2018/0354505 A1 | 12/2018 | Meier et al. |
| 2018/0356817 A1 | 12/2018 | Poeppel |
| 2018/0373929 A1 | 12/2018 | Ye |
| 2019/0034764 A1 | 1/2019 | Oh et al. |
| 2019/0064929 A1 | 2/2019 | Tomeh et al. |
| 2019/0071093 A1 | 3/2019 | Ma et al. |
| 2019/0072965 A1 | 3/2019 | Zhang et al. |
| 2019/0072966 A1 | 3/2019 | Zhang et al. |
| 2019/0073908 A1 | 3/2019 | Neubecker et al. |
| 2019/0088135 A1 | 3/2019 | Do et al. |
| 2019/0096135 A1 | 3/2019 | Mutto et al. |
| 2019/0102642 A1* | 4/2019 | Tanabe ................. H04N 13/239 |
| 2019/0139419 A1 | 5/2019 | Wendt et al. |
| 2019/0147259 A1 | 5/2019 | Molin et al. |
| 2019/0163204 A1 | 5/2019 | Bai et al. |
| 2019/0171912 A1 | 6/2019 | Vallespi-Gonzalez et al. |
| 2019/0193751 A1 | 6/2019 | Fernando et al. |
| 2019/0196471 A1 | 6/2019 | Vaughn et al. |
| 2019/0205798 A1 | 7/2019 | Rosas-Maxemin et al. |
| 2019/0213324 A1 | 7/2019 | Thorn |
| 2019/0220011 A1 | 7/2019 | Penna |
| 2019/0225214 A1 | 7/2019 | Pohl et al. |
| 2019/0246042 A1 | 8/2019 | Liu |
| 2019/0253614 A1 | 8/2019 | Oleson et al. |
| 2019/0279046 A1 | 9/2019 | Han et al. |
| 2019/0279293 A1 | 9/2019 | Tang et al. |
| 2019/0287515 A1 | 9/2019 | Li et al. |
| 2019/0291720 A1 | 9/2019 | Xiao et al. |
| 2019/0304102 A1 | 10/2019 | Chen et al. |
| 2019/0311226 A1 | 10/2019 | Xiao et al. |
| 2019/0315346 A1 | 10/2019 | Yoo et al. |
| 2019/0333233 A1* | 10/2019 | Hu ........................ G01S 13/04 |
| 2019/0337521 A1 | 11/2019 | Stauber |
| 2019/0340924 A1 | 11/2019 | Abari et al. |
| 2019/0347492 A1 | 11/2019 | Morimura et al. |
| 2019/0355132 A1 | 11/2019 | Kushleyev et al. |
| 2019/0378006 A1 | 12/2019 | Fukuda et al. |
| 2019/0384303 A1 | 12/2019 | Muller et al. |
| 2019/0392831 A1 | 12/2019 | Pohl |
| 2020/0012871 A1 | 1/2020 | Lee et al. |
| 2020/0027002 A1 | 1/2020 | Hickson et al. |
| 2020/0027351 A1 | 1/2020 | Gotoda et al. |
| 2020/0027355 A1 | 1/2020 | Sujan et al. |
| 2020/0053262 A1 | 2/2020 | Wexler et al. |
| 2020/0074326 A1 | 3/2020 | Balakrishnan et al. |
| 2020/0086881 A1 | 3/2020 | Abendroth et al. |
| 2020/0090426 A1 | 3/2020 | Barnes et al. |
| 2020/0110982 A1 | 4/2020 | Gou et al. |
| 2020/0117902 A1 | 4/2020 | Wexler et al. |
| 2020/0120267 A1 | 4/2020 | Netto et al. |
| 2020/0125927 A1 | 4/2020 | Kim |
| 2020/0156784 A1 | 5/2020 | Carnell |
| 2020/0175384 A1 | 6/2020 | Zhang et al. |
| 2020/0175550 A1 | 6/2020 | Raichelgauz et al. |
| 2020/0269864 A1 | 8/2020 | Zhang et al. |
| 2020/0272940 A1 | 8/2020 | Sun et al. |
| 2020/0293035 A1 | 9/2020 | Sakurada et al. |
| 2020/0302295 A1 | 9/2020 | Tung et al. |
| 2020/0304707 A1 | 9/2020 | Williams et al. |
| 2020/0320296 A1* | 10/2020 | Jiang ........................ G06T 7/11 |
| 2020/0324778 A1 | 10/2020 | Diamond et al. |
| 2020/0370890 A1 | 11/2020 | Hamilton et al. |
| 2020/0371518 A1 | 11/2020 | Kang |
| 2020/0410322 A1 | 12/2020 | Naphade et al. |
| 2021/0009270 A1 | 1/2021 | Chen et al. |
| 2021/0041248 A1 | 2/2021 | Li et al. |
| 2021/0049908 A1 | 2/2021 | Pipe et al. |
| 2021/0055741 A1 | 2/2021 | Kawanai et al. |
| 2021/0056492 A1 | 2/2021 | Zass |
| 2021/0056852 A1 | 2/2021 | Lund et al. |
| 2021/0096565 A1 | 4/2021 | Xie et al. |
| 2021/0097309 A1 | 4/2021 | Kaku et al. |
| 2021/0148831 A1 | 5/2021 | Raichelgauz et al. |
| 2021/0164177 A1 | 6/2021 | Wientjes |
| 2021/0182539 A1 | 6/2021 | Rassool |
| 2021/0192357 A1 | 6/2021 | Sinha et al. |
| 2021/0209332 A1 | 7/2021 | Nishio et al. |
| 2021/0224917 A1 | 7/2021 | Gaudin et al. |
| 2021/0248904 A1 | 8/2021 | Nguyen |
| 2021/0266437 A1 | 8/2021 | Wexler et al. |
| 2021/0272207 A1 | 9/2021 | Fields et al. |
| 2021/0284183 A1 | 9/2021 | Marenco et al. |
| 2021/0284191 A1 | 9/2021 | Raichelgauz et al. |
| 2021/0316747 A1 | 10/2021 | Klein |
| 2021/0390351 A1 | 12/2021 | Romain, II |
| 2021/0390840 A1 | 12/2021 | Rejal et al. |
| 2021/0398294 A1* | 12/2021 | Cui ........................ G06F 18/214 |
| 2021/0409593 A1 | 12/2021 | Zacharias et al. |
| 2022/0005291 A1 | 1/2022 | Konrardy et al. |
| 2022/0038620 A1 | 2/2022 | Demers |
| 2022/0058393 A1 | 2/2022 | Calvert et al. |
| 2022/0126864 A1 | 4/2022 | Moustafa et al. |
| 2022/0161815 A1 | 5/2022 | Beek et al. |
| 2022/0187847 A1 | 6/2022 | Cella et al. |
| 2022/0191389 A1 | 6/2022 | Lei |
| 2022/0234501 A1 | 7/2022 | Odinaev et al. |
| 2022/0286603 A1 | 9/2022 | Lv et al. |
| 2022/0327886 A1 | 10/2022 | Mathur et al. |

(56) References Cited

U.S. PATENT DOCUMENTS

| | | | |
|---|---|---|---|
| 2022/0345621 | A1 | 10/2022 | Shi et al. |
| 2023/0145701 | A1* | 5/2023 | Parchami ............. G06N 3/0464 382/103 |
| 2023/0334729 | A1* | 10/2023 | Zhou ........................ G06T 7/11 |

FOREIGN PATENT DOCUMENTS

| | | |
|---|---|---|
| CN | 107472252 B | 4/2022 |
| CN | 111866468 B | 6/2022 |
| DE | 102012009297 A1 | 12/2012 |
| DE | 102016122686 A1 | 5/2018 |
| EP | 1085464 A3 | 1/2007 |
| EP | 3910540 A1 | 11/2021 |
| JP | 2018511807 A | 4/2018 |
| WO | 0231764 A2 | 4/2002 |
| WO | 2003067467 A1 | 8/2003 |
| WO | 2005027457 A1 | 3/2005 |
| WO | 2007049282 A2 | 5/2007 |
| WO | 2014076002 A1 | 5/2014 |
| WO | 2014137337 A1 | 9/2014 |
| WO | 2014141282 A1 | 9/2014 |
| WO | 2016040376 A1 | 3/2016 |
| WO | 2016070193 A1 | 5/2016 |
| WO | 2018035145 A1 | 2/2018 |
| WO | 2018132088 A1 | 7/2018 |

OTHER PUBLICATIONS

Zhou et al., "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.

Zhu et al., "Technology-Assisted Dietary Assesment", Proc SPIE. Mar. 20, 2008, pp. 1-15.

Zou et al., "A Content-Based Image Authentication System with Lossless Data Hiding", ICME 2003, pp. 213-216.

"Computer Vision Demonstration Website", Electronics and Computer Science, University of Southampton, 2005, USA.

Boari et al, "Adaptive Routing for Dynamic Applications in Massively Parallel Architectures", 1995 IEEE, Spring 1995, pp. 1-14.

Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

C. Huang et al., "ACT: An Autonomous Drone Cinematography System for Action Scenes," 2018 IEEE International Conference onRobotics and Automation (ICRA), 2018, pp. 7039-7046, doi: 10.1109/ICRA.2018.8460703. (Year: 2018).

Cernansky et al, "Feed-forward Echo State Networks", Proceedings of International Joint Conference on Neural Networks, Montreal, Canada, Jul. 31-Aug. 4, 2005, pp. 1-4.

Chinchor, Nancy A. et al.; Multimedia Analysis + Visual Analytics = Multimedia Analytics; IEEE Computer Society; 2010; pp. 52-60. (Year: 2010).

Fathy et al, "A Parallel Design and Implementation For Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.

Freisleben et al, "Recognition of Fractal Images Using a Neural Network", Lecture Notes in Computer Science, 1993, vol. 6861, 1993, pp. 631-637,.

Galvane, Quentin, et al. "Automated cinematography with unmanned aerial vehicles." arXiv preprint arXiv: 1712.04353 (2017). (Year: 2017).

Garcia, "Solving the Weighted Region Least Cost Path Problem Using Transputers", Naval Postgraduate School, Monterey, California, Dec. 1989.

Guo et al, AdOn: An Intelligent Overlay Video Advertising System (Year: 2009) .

Hogue, "Tree Pattern Inference and Matching for Wrapper Induction on the World Wide Web", Master's Thesis, Massachusetts Institute of Technology, Jun. 2004, pp. 1-106 .

Howlett et al., "A Multi-Computer Neural Network Architecture in a Virtual Sensor System Application", International journal of knowledge-based intelligent engineering systems, 4 (2). pp. 86-93, l33N 1327-2314.

Tu, Weiming, et al. "A survey on visual content-based video indexing and retrieval." IEEE Transactions on Systems, Man, andCybernetics, Part C (Applications and Reviews) 41.6 (2011 ): 797-819. (Year: 2011).

Tuang, Chong, et al. "One-shot imitation filming of human motion videos." arXiv preprint arXiv:1912.10609 (2019). (Year: 2019).

J. Chen and p. Carr, "Mimicking Human Camera Operators," 2015 IEEE Winter Conference on Applications of Computer Vision, 2015, pp. 215-222, doi: 10.1109/WACV.2015.36. (Year: 2015).

Johnson et al., "Pulse-Coupled Neural Nets: Translation, Rotation, Scale, Distortion, and Intensity Signal Invariance for Images", Applied Optics, vol. 33, No. 26, 1994, pp. 6239-6253.

Joubert, Niels, et al. "Towards a drone cinematographer: Guiding quadrotor cameras using visual composition principles." arXivpreprint arXiv: 1610.01691 (2016). (Year: 2916).

Lau et al., "Semantic Web Service Adaptation Model for a Pervasive Learning Scenario", 2008 IEEE Conference on Innovative Technologies in Intelligent Systems and Industrial Applications, 2008, pp. 98-103.

Li et al.("Matching Commercial Clips from TV Streams Using a Unique, Robust and Compact Signature" 2005) (Year: 2005).

Li, Yijun, Jesse S. Jin, and Xiaofang Zhou. "Matching commercial clips from TV streams using a unique, robust and compactsignature." Digital Image Computing: Techniques and Applications (DICTA'05). IEEE, 2005. (Year: 2005).

Lin et al., "Generating robust digital signature for image/video authentication", Multimedia and Security Workshop at ACM Multimedia '98, Bristol, U.K., Sep. 1998, pp. 245-251.

Lyon, "Computational Models of Neural Auditory Processing", IEEE International Conference on Acoustics, Speech, and Signal Processing, ICASSP '84, Date of Conference: Mar. 1984, vol. 9, pp. 41-44.

M. Gschwindt,, "Can a Robot Become a Movie Director? Learning Artistic Principles for Aerial Cinematography," 2019 IEEE/RSJw International Conference on Intelligent Robots and Systems (IROS), 2019, pp. 1107-1114, doi: 10.1109/IROS40897.2019.896759 (Year: 2019).

May et al, "The Transputer", Springer-Verlag Berlin Heidelberg 1989, vol. 41.

McNamara et al., "Diversity Decay in opportunistic Content Sharing Systems", 2011 IEEE International Symposium on a World of Wireless, Mobile and Multimedia Networks, pp. 1-3.

Morad et al., "Performance, Power Efficiency and Scalability of Asymmetric Cluster Chip Multiprocessors", Computer Architecture Letters, vol. 4, Jul. 4, 2005, pp. 1-4, XP002466254.

Nagy et al, "A Transputer, Based, Flexible, Real-Time Control System for Robotic Manipulators", UKACC International Conference on Control '96, Sep. 2-5, 1996, Conference Publication No. 427, IEE 1996.

Natschlager et al., "The "Liquid Computer": A novel strategy for real-time computing on time series", Special Issue on Foundations of Information Processing of telematik, vol. 8, No. 1, 2002, pp. 39-43, XP002466253.

Odinaev et al, "Cliques in Neural Ensembles as Perception Carriers", Technion—Institute of Technology, 2006 International Joint Conference on neural Networks, Canada, 2006, pp. 285-292.

Ortiz-Boyer et al., "CIXL2: A Crossover Operator for Evolutionary Algorithms Based on Population Features", Journal of Artificial Intelligence Research 24 (2005) Submitted Nov. 2004; published Jul. 2005, pp. 1-48.

Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).

(56) References Cited

OTHER PUBLICATIONS

Queluz, "Content-Based Integrity Protection of Digital Images", SPIE Conf. on Security and Watermarking of Multimedia Contents, San Jose, Jan. 1999, pp. 85-93.

Retrieval, Story. Ehsan Younessian. Diss. Nanyang Technological University, 2013: i-187 (Year: 2013).

Santos et al., "SCORM-MPEG: an Ontology of Interoperable Metadata for multimediaand E-Learning", 23rd International Conference on Software, Telecommunications and Computer Networks (SoftCom), 2015, pp. 224-228.

Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.

Schneider et al, "A Robust Content based Digital Signature for Image Authentication", Proc. ICIP 1996, Lausane, Switzerland, Oct. 1996, pp. 227-230.

Stolberg et al ("HIBRID-SOC: a Multi-Core SOC Architecture for Multimedia Signal Processing" 2003).

Stolberg et al, "HIBRID-SOC: a Mul Ti-Core SOC Architecture for Mul Timedia Signal Processing", 2003 IEEE, pp. 189-194.

Theodoropoulos et al, "Simulating Asynchronous Architectures on Transputer Networks", Proceedings of the Fourth Euromicro Workshop On Parallel and Distributed Processing, 1996. PDP '96, pp. 274-281.

Vallet et al ("Personalized Content Retrieval in Context Using Ontological Knowledge" Mar. 2007) (Year: 2007).

Vallet, David, et al. "Personalized content retrieval in context using ontological knowledge." IEEE Transactions on circuits andsystems for video technology 17.3 (2007): 336-346. (Year: 2007).

Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.

Wang et al, "Classifying Objectionable Websites Based onImage Content", Stanford University, pp. 1-12.

Ware et al, "Locating and Identifying Components in a Robot's Workspace using a Hybrid Computer Architecture" Proceedings of the 1995 IEEE International Symposium on Intelligent Control, Aug. 27- 29, 1995, pp. 139-144.

Whitby-Strevens, "The transputer", 1985 IEEE, pp. 292-300.

Wilk et al., "The Potential of Social-Aware Multimedia Prefetching on Mobile Devices", International Conference and Workshops on networked Systems (NetSys), 2015, pp. 1-5.

Yanagawa et al, "Columbia University's Baseline Detectors for 374 LSCOM Semantic Visual Concepts", Columbia University Advent Technical Report # 222-2006-8, Mar. 20, 2007, pp. 1-17.

Yanagawa et al, "Columbia University's Baseline Detectors for 374 LSCOM Semantic Visual Concepts", Columbia University Advent Technical Report #222, 2007, pp. 2006-2008.

Yanai, Generic Image Classification Using Visual Knowledge on the Web, pp. 167-174 (Year: 2003).

\* cited by examiner

CONTEXT BASED SEPARATION OF ON-/OFF-VEHICLE POINTS OF INTEREST IN VIDEOS

BACKGROUND

Tracking pixels on a moving object between frames have numerous applications in computer vision, including accurate velocity estimation of the target vehicle, estimation of rotation of the target vehicle, matching vehicles between frames.

However, the problem of pixel tracking ("find the same pixel in both frames") is inherently ill-defined. For example, a pixel on the edge of the vehicle in the source frame might be considered to belong to the vehicle or it might be considered to belong to the background. These choices might lead to two different pixels in the target frame that could be rightfully matched to this source frame pixel.

There is a growing need to accurately separate background pixels from a moving vehicle pixels.

SUMMARY

There is provided a method, a system and/or a non-transitory computer readable medium for providing a context based separation of on-/off-vehicle points of interest in videos.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
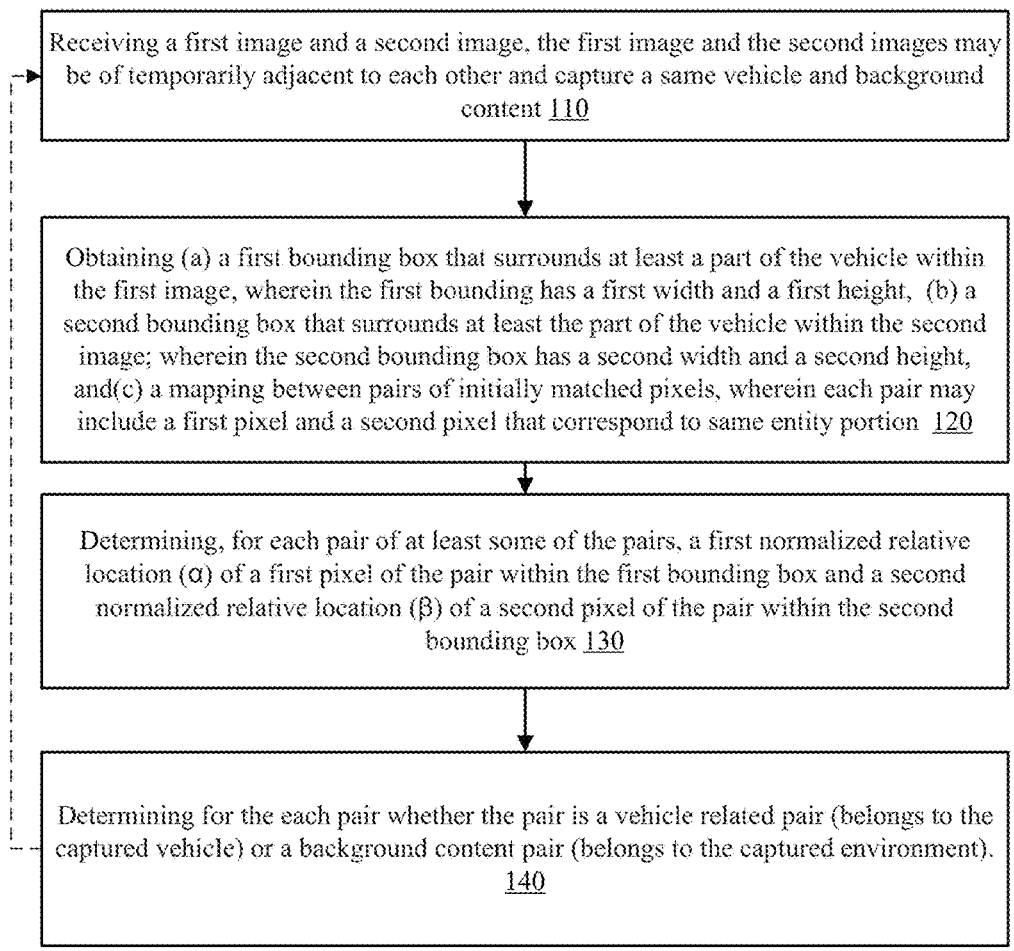
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one of the units may be implemented in hardware and/or code, instructions and/or commands stored in a non-transitory computer readable medium, may be included in a vehicle, outside a vehicle, in a mobile device, in a server, and the like.

The vehicle may be any type of vehicle that a ground transportation vehicle, an airborne vehicle, and a water vessel.

The specification and/or drawings may refer to an image. An image is an example of a media unit. Any reference to an image may be applied mutatis mutandis to a media unit. A media unit may be an example of sensed information. Any reference to a media unit may be applied mutatis mutandis to any type of natural signal such as but not limited to signal generated by nature, signal representing human behavior, signal representing operations related to the stock market, a medical signal, financial series, geodetic signals, geophysical, chemical, molecular, textual and numerical signals, time series, and the like. Any reference to a media unit may be applied mutatis mutandis to sensed information. The sensed information may be of any kind and may be sensed by any type of sensors—such as a visual light camera, an audio sensor, a sensor that may sense infrared, radar imagery, ultrasound, electro-optics, radiography, LIDAR (light detection and ranging), etc. The sensing may include generating samples (for example, pixel, audio signals) that represent the signal that was transmitted, or otherwise reach the sensor.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

The term obtaining may include at least one of receiving, retrieving, requesting and getting, being fed by, generating, or receiving a partially processed result and completing the process.

There may be provided a method, a system and/or a non-transitory computer readable medium for context based separation between vehicle pixels and background pixels.

FIG. 1 illustrates method 100 for context based separation between vehicle pixels and background pixels.

Method 100 may start by step 110 of receiving a first image and a second image, the first image and the second images may be of temporarily adjacent to each other and capture a same vehicle and background content. While the vehicle is the same vehicle—the background content may change—due to the time difference between the images and/or due to differences in acquisition parameters (optical axis changes, illumination changes, focus changes) of the images.

Adjacent—may be consecutive images or images spaced apart by up to 1, 2, 3, 4, 5, seconds, and the like.

Step 110 may be followed by step 120 of obtaining:

(a) a first bounding box that surrounds at least a part of the vehicle within the first image, wherein the first bounding has a first width and a first height.

(b) a second bounding box that surrounds at least the part of the vehicle within the second image; wherein the second bounding box has a second width and a second height.

(c) a mapping between pairs of initially matched pixels, wherein each pair may include a first pixel and a second pixel that correspond to same entity portion (are initially tagged or determined to belong to the captured entity portion within the first and second image respectively), wherein the entity portion may be a portion of the vehicle or of the background content.

The first bounding box may be obtained before the acquisition of the second image.

The mapping may be provided by a temporal compressor, or another entity.

The first bounding box and the second bounding box may be provided by an object detector.

The first bounding box and the second bounding box may be two dimensional (2D) or three dimensional (3D). Their vertices and their edges may be represented in a physical (for example X,Y,Z) coordinate system. The pairs of pixels may be provided in a pixel coordinate system. The pixel coordinate system represents locations of pixels within the image—for example—the (m,n)'th pixel is located within the n'th column and the m'th row of pixels.

The method may include coordinate system conversions—for example from the pixel coordinate system to the physical coordinate system.

A part of an object may not be flat—but it may be bounded by a flat 2D bounding box—or by a flat facet of a 3D bounding box. This difference should be taken into account.

Accordingly—a first normalized relative location of the first pixel may be calculated based on an estimate of a shape and size of the part of the vehicle and/or on an estimate of a deviation from flatness of the part of the vehicle.

The shapes of different parts of different vehicles can be provided to the method—or may be learnt in any manner.

Step 120 may be followed by step 130 of determining, for each pair of at least some of the pairs, a first normalized relative location ($\alpha$) of a first pixel of the pair within the first bounding box and a second normalized relative location ($\beta$) of a second pixel of the pair within the second bounding box.

Step 130 may be applied on all pixels of the images or only on some. The latter may save energy and time.

The at least some pairs that are relevant to step 130 may include (a) only some of the first pixels within the first bounding box, (b) all first pixels within the first bounding box, (c) or first pixels located in a predefined proximity to an estimated edge of the vehicle. The estimates edge of the vehicle may be provided from an object detector or another entity.

The at least some pairs that are relevant to step 130 may include (a) only some of the second pixels within the second bounding box, (b) all second pixels within the second bounding box, (c) or second pixels located in a predefined proximity to an estimated edge of the vehicle. The estimates edge of the vehicle may be provided from an object detector or another entity.

The normalized location takes into account the location of the pixel and the dimensions of the bounding boxes.

The first normalized relative location of the first pixel may be calculated within a pixel coordinate system.

Step 130 may include calculating the first normalized relative location of the first pixel based on (a) a first axis distance from a certain vertex of the first bounding box, (b) the first width, (c) a second axis distance from the certain vertex of the first bounding box, and (d) the first height.

Step 130 may include calculating the first normalized relative location of the first pixel by calculating a first ratio between the first axis distance from the certain vertex of the first bounding box, and the first width, and a second ratio between the second axis distance from the certain vertex of the first bounding box, and the first height.

Step 130 may be followed by step 140 of determining for the each pair whether the pair is a vehicle related pair (belongs to the captured vehicle) or a background content pair (belongs to the captured environment).

Step 140 may include determining that a pair may be the vehicle related based on a distance between the first and second normalized relative locations. Especially—comparing the distance to a certain threshold—and when exceeding the threshold—the pair belongs to the vehicle.

The threshold can be determined or received in any manner—using a machine learning process, using a rule based decision, and the like.

The threshold may depend on at least one of—location difference between the vehicle in the first and second images (may be a function of time between images, speed of the vehicle), image capture accuracy (lower accuracy—larger threshold), desired false positive rate, desired false negative rate, desired true positive rate or desired true negative rate, and the like.

Figure 2:
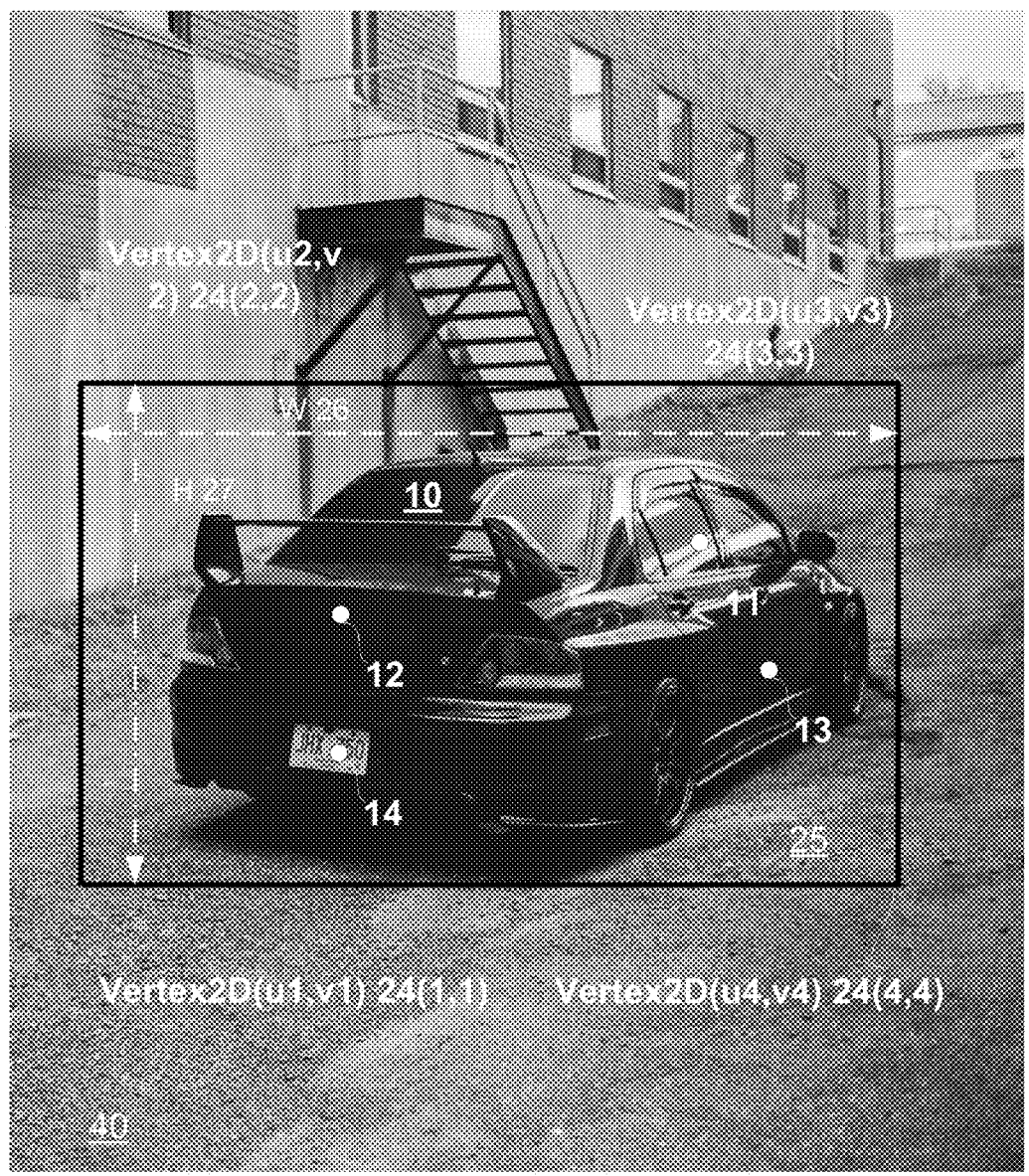
FIG. 2 illustrates an example of a vehicle and a 2D bounding box.
Figure 3:
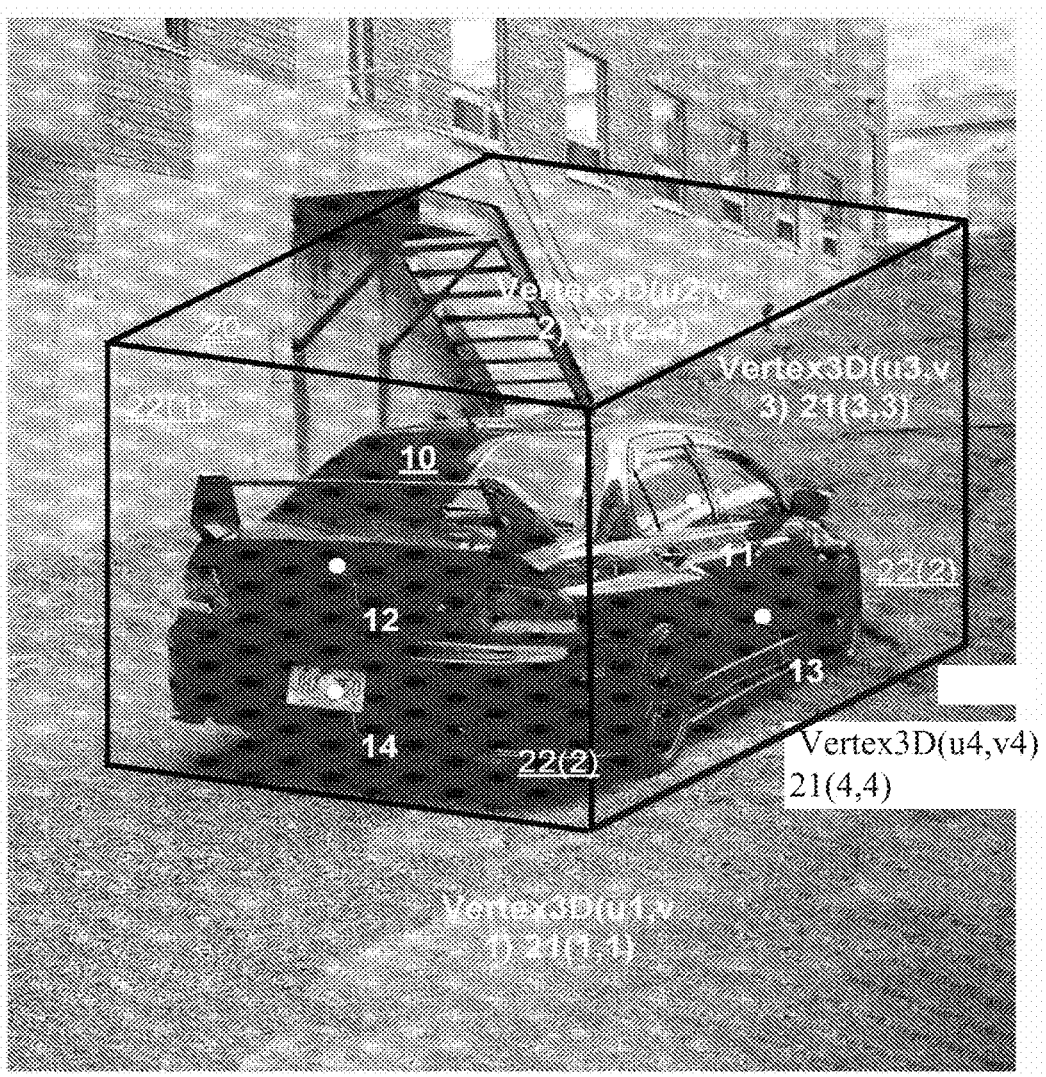
FIG. 3 illustrates an example of a vehicle and a 3D bounding box.

FIGS. 2 and 3 illustrate various calculations. The calculations should be done of a first image of a pair and on a second image of a pair. These example refer to three points of the vehicle 11, 12 and 13—but may be applied on any number of pixels within the bounding box—see, for example, the pixels on which step 130 is applied. The normalized distances may be calculated in relation to any vertex or reference point of the bounding box.

Referring to FIG. 2. This figure illustrates a 2D dimensional bounding box 25 that has four 2D vertexes—Vertex2D(u1,v1) 24(1,1), Vertex2D(u2,v2) 24(2,2), Vertex2D(u3,v3) 24(3,3), and Vertex2D(u4,v4) 24(4,4) (whereas u1, v1, u2, v2, u3, v3, u4 and v4 are their pixel coordinates).

Assuming that the distance is calculated in relation to Vertex2D(u1,v1).

The normalized relative locations of three different pixels of the vehicle 11, 12 and 13 (located at pixel coordinates (u(11), v(11)), (u(12), v(12)) and (u(13), v(13))) are:

$$\alpha(11) = \frac{(u(11) - u1)}{W}$$

$$\beta(11) = \frac{(v(11) - v1)}{H}$$

$$\alpha(12) = \frac{(u(12) - u1)}{W}$$

$$\beta(12) = \frac{(v(12) - v2)}{H}$$

$$\alpha(13) = \frac{(u(13) - u1)}{W}$$

$$\beta(13) = \frac{(v(13) - v1)}{H}$$

Referring to FIG. 3. This figure illustrates a 23 dimensional bounding box 20 that has eight vertexes (seven vertices are shown) and multiple facets (three are shown). The 3D vertices of facet 22(2) are shown and include Vertex3D(u1,v1) 21(1,1), Vertex3D(u2,v2) 21(2,2), Vertex3D(u3,v3) 21(3,3), and Vertex2D(u4,v4) 21(4,4). The coordinates of the fours 3D vertices are (u1, v1), (u2, v2), (u3, v3), and (u4 and v4) in the pixel coordinate system and (x1,y1,z1), (x2,y2,z2), (x3,y3,z3) and (x4, y4,z4) in a physical coordinate system.

The normalized relative locations of three different pixels of the vehicle 11, 12 and 13 (located at pixel coordinates (u(11), v(11)), (u(12), v(12)) and (u(13), v(13))) are:

$$\begin{pmatrix} \alpha(11) \\ \beta(11) \end{pmatrix} = \begin{pmatrix} (u_4 - u_1) & (u_2 - u_1) \\ (v_4 - v_1) & (v_2 - v_1) \end{pmatrix}^{-1} * \begin{pmatrix} (u(11) - u_1) \\ (v(11) - v_1) \end{pmatrix}$$

$$\begin{pmatrix} \alpha(12) \\ \beta(12) \end{pmatrix} = \begin{pmatrix} (u_4 - u_1) & (u_2 - u_1) \\ (v_4 - v_1) & (v_2 - v_1) \end{pmatrix}^{-1} * \begin{pmatrix} (u(12) - u_1) \\ (v(12) - v_1) \end{pmatrix}$$

$$\begin{pmatrix} \alpha(13) \\ \beta(13) \end{pmatrix} = \begin{pmatrix} (u_4 - u_1) & (u_2 - u_1) \\ (v_4 - v_1) & (v_2 - v_1) \end{pmatrix}^{-1} * \begin{pmatrix} (u(13) - u_1) \\ (v(13) - v_1) \end{pmatrix}$$

Figure 4:
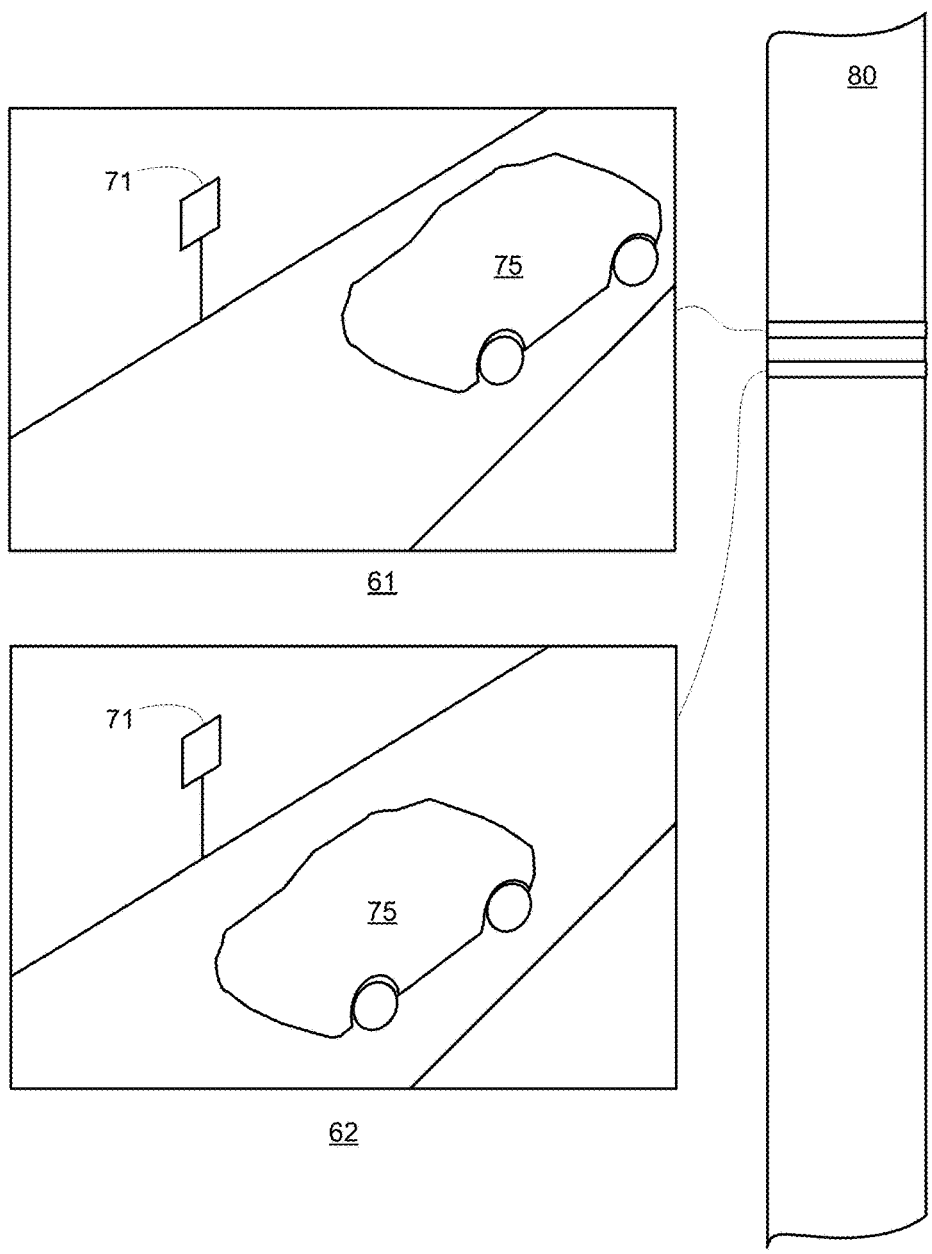
FIG. 4 is an example of a first and second images.

FIG. 4 illustrates an example of a video stream 80, a first image 61, a second image 62—both images capture a vehicle 75 and its environment—the environment includes a road and a sign 71. The first and second images belong to the video stream 80 and are relatively close to each other (from a time of acquisition point of time).

Figure 5:
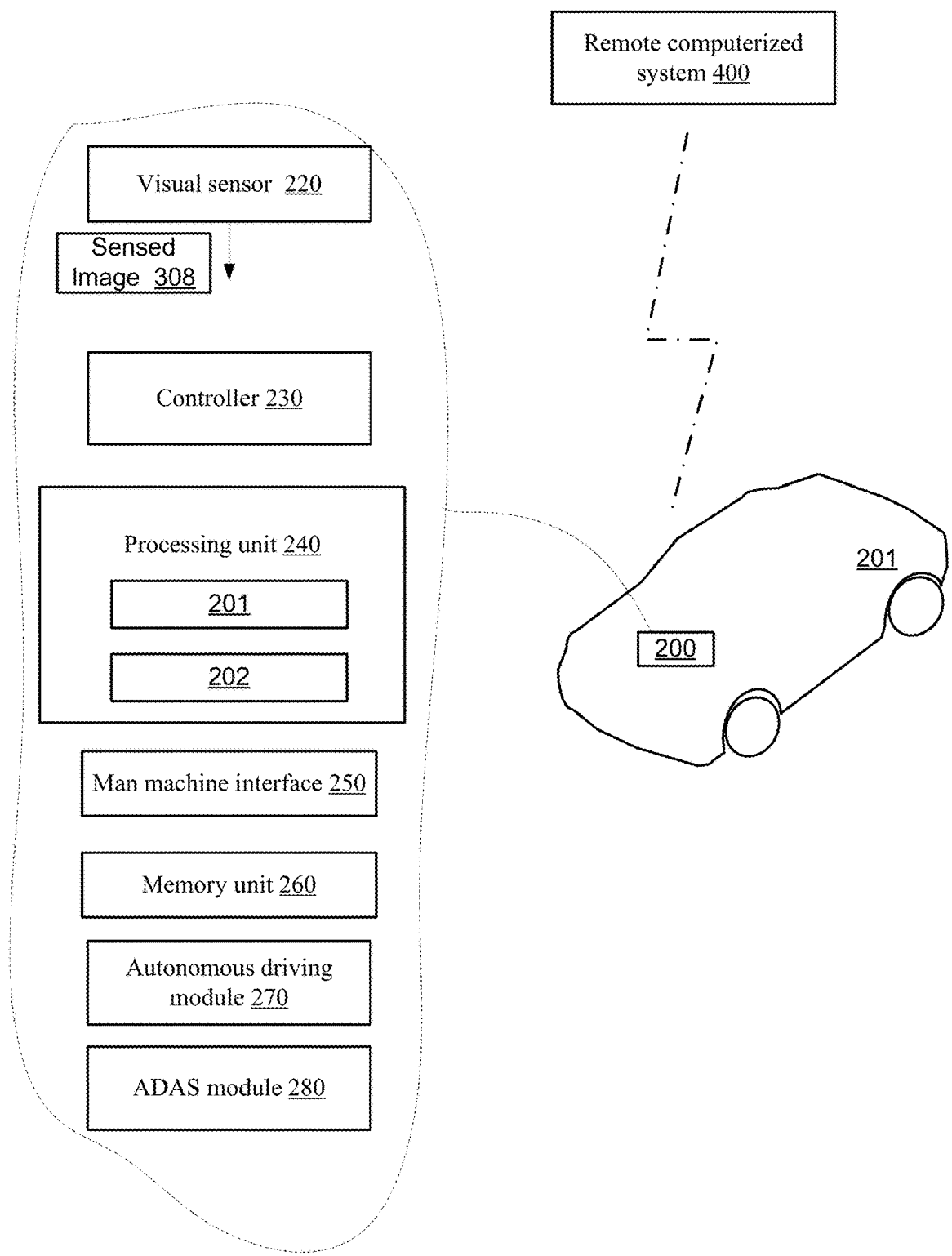
FIG. 5 illustrates an example of a vehicle.

FIG. 5 illustrates metadata a vehicle 201 that include system 200.

System 200 may include visual sensor 220 such as a camera (illustrated as outputting sensed image 308), controller 230, processing unit 240, man machine interface such as display 250, memory unit 260, autonomous driving module 270 and ADAS module 280.

The autonomous driving module 270, and ADAS module 280 may respond to lane boundary information generated by the processing unit 240.

The controller 230 may control the operation of the system 200.

System 200 may be configured to execute method 100. Alternatively—remote computerized system 400 may execute method 100.

System 200 (or remote computerized system 400) may include a first module 201 for obtaining information and/or mappings related to steps 110, and 120, and may also include a second module for executing steps 130 and 140.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed:

1. A method for context based separation between vehicle pixels and background pixels, the method comprises:
   receiving a first image and a second image, the first image and the second images are of temporarily adjacent to each other and capture a same vehicle and background content;
   obtaining a first bounding box that surrounds at least a part of the vehicle within the first image; wherein the first bounding has a first width and a first height;
   obtaining a second bounding box that surrounds at least the part of the vehicle within the second image; wherein the second bounding box has a second width and a second height;
   obtaining a mapping between pairs of initially matched pixels, wherein each pair comprises a first pixel and a second pixel that correspond to same entity portion, wherein the entity portion is a portion of the vehicle or of the background content;
   determining, for each pair of at least some of the pairs, a first normalized relative location of a first pixel of the pair within the first bounding box and a second normalized relative location of a second pixel of the pair within the second bounding box; wherein the determining of the first normalized relative location of the first pixel is based on (a) a first axis distance from a certain vertex of the first bounding box, (b) the first width, (c) a second axis distance from the certain vertex of the first bounding box, and (d) the first height; and
   determining for the each pair whether the pair is a vehicle related pair or a background content pair.

2. The method according to claim 1 wherein the first normalized relative location of the first pixel is calculated within a pixel coordinate system.

3. The method according to claim 1 wherein the first normalized relative location of the first pixel comprises a first ratio between the first axis distance from the certain vertex of the first bounding box, and the first width, and a second ratio between the second axis distance from the certain vertex of the first bounding box, and the first height.

4. The method according to claim 1 comprising determining that a pair is the vehicle related based on a distance between the first and second normalized relative locations.

5. The method according to claim 1 wherein the at least some pairs comprises only some of the first pixels within the first bounding box.

6. The method according to claim 1 wherein the at least some pairs comprises all first pixels within the first bounding box.

7. The method according to claim 1 wherein the at least some pairs comprises only first pixels located in a predefined proximity to an estimated edge of the vehicle.

8. The method according to claim 1 wherein the first bounding box is a two dimensional bounding box.

9. The method according to claim 1 wherein the first bounding box is a three dimensional bounding box.

10. The method according to claim 9 wherein coordinates of vertexes of the first bounding box are provided in a three dimensional physical environment coordinate system, and wherein the first bounding box is a three dimensional bounding box.

11. A non-transitory computer readable medium that stores instructions for context based separation, the non-transitory computer readable medium stores instructions that once executed by a processor cause the processor to: receive a first image and a second image, the first image and the second images are of temporarily adjacent to each other and capture a same vehicle and background content; obtain a first bounding box that surrounds at least a part of the vehicle within the first image; wherein the first bounding has a first width and a first height; obtain a second bounding box that surrounds at least the part of the vehicle within the second image; wherein the second bounding box has a second width and a second height; obtain a mapping between pairs of initially matched pixels, wherein each pair comprises a first pixel and a second pixel that correspond to same entity portion, wherein the entity portion is a portion of the vehicle or of the background content; determine, for each pair of at least some of the pairs, a first normalized relative location of a first pixel of the pair within the first bounding box and a second normalized relative location of a second pixel of the pair within the second bounding box; wherein the determining of the first normalized relative location of the first pixel is based on (a) a first axis distance from a certain vertex of the first bounding box, (b) the first width, (c) a second axis distance from the certain vertex of the first bounding box, and (d) the first height; and determine for the each pair whether the pair is a vehicle related pair or a background content pair.

12. The non-transitory computer readable medium according to claim 11, wherein the first normalized relative location of the first pixel comprises a first ratio between the first axis distance from the certain vertex of the first bounding box, and the first width, and a second ratio between the second axis distance from the certain vertex of the first bounding box, and the first height.

13. The non-transitory computer readable medium according to claim 11, that stores instructions that once executed by the processor cause the processor to determine that a pair is the vehicle related based on a distance between the first and second normalized relative locations.

14. The non-transitory computer readable medium according to claim 11, wherein the at least some pairs comprises only some of the first pixels within the first bounding box.

15. The non-transitory computer readable medium according to claim 11, wherein the at least some pairs comprises all first pixels within the first bounding box.

16. The non-transitory computer readable medium according to claim 11, wherein the at least some pairs comprises only first pixels located in a predefined proximity to an estimated edge of the vehicle.

17. The non-transitory computer readable medium according to claim 11, wherein the first bounding box is a two dimensional bounding box.

18. The non-transitory computer readable medium according to claim 11, wherein the first bounding box is a three dimensional bounding box.

19. The non-transitory computer readable medium according to claim 18, wherein coordinates of vertexes of the first bounding box are provided in a three dimensional physical environment coordinate system, and wherein the first bounding box is a three dimensional bounding box.

* * * * *